(12) United States Patent
Bischoff et al.

(10) Patent No.: US 6,555,662 B1
(45) Date of Patent: Apr. 29, 2003

(54) PROCESS FOR MAKING SILOXANE COMPOSITIONS

(75) Inventors: Remy Bischoff, Brussels (BE); Richard Taylor, Barry (GB)

(73) Assignee: Dow Corning Ltd., South Glamorgan (GB)

( * ) Notice: Subject to any disclaimer, the term of this patent is extended or adjusted under 35 U.S.C. 154(b) by 0 days.

(21) Appl. No.: 09/026,630

(22) Filed: Feb. 20, 1998

(30) Foreign Application Priority Data

Mar. 20, 1997 (GB) .............................................. 9703553

(51) Int. Cl.$^7$ ................................................. C02F 7/08
(52) U.S. Cl. ...................... 532/450; 532/453; 538/21; 538/23
(58) Field of Search ................................. 556/450, 453; 528/21, 23

(56) References Cited

U.S. PATENT DOCUMENTS

| | | | | |
|---|---|---|---|---|
| 5,380,902 A | * | 1/1995 | Hager et al. ............. | 556/450 X |
| 5,382,644 A | * | 1/1995 | Motague et al. .......... | 528/21 X |
| 5,403,909 A | * | 4/1995 | Rubinsztajn ............ | 556/453 X |
| 5,510,441 A | * | 4/1996 | Razzano ................... | 528/23 X |
| 5,696,219 A | * | 12/1997 | Jallouli et al. ................ | 528/21 |

FOREIGN PATENT DOCUMENTS

EP      0 503 825 A1     9/1992

OTHER PUBLICATIONS

Schwesinger et al., Liebigs Ann. 1996, 1055–1081.
Molenberg and Moller, Maromol Rapid Commun. 16, 449–453 (1995).
Van Dyke and Clarson in Poly Prep ACS Div. Polym Chem 1996, 37,668.
Poly Prep ACS, Div, Polym. Chem, 1996, vol. 37, pp. 668–669.
Macromol. Rapid Commun. 16, pp. 449–453 (1995).
Angew. Chem. Int. Ed. Engle, 1993, 32, No. 9, pp. 1361–1363.

* cited by examiner

*Primary Examiner*—Paul F. Shaver
(74) *Attorney, Agent, or Firm*—Jennifer S. Warren

(57) ABSTRACT

A process for making a dispersion of a high viscosity siloxane in a volatile cyclosiloxane comprises the step of effecting ring-opening polymerisation of a volatile cyclosiloxane under catalysis by a phosphazene base, and the step of stopping the polymerisation reaction before completion of the ring-opening polymerisation of the cyclosiloxane has occurred. Preferably the polymerisation reaction is stopped by adding carbon dioxide or an acid.

14 Claims, 1 Drawing Sheet

PROCESS FOR MAKING SILOXANE COMPOSITIONS

Figure 1:
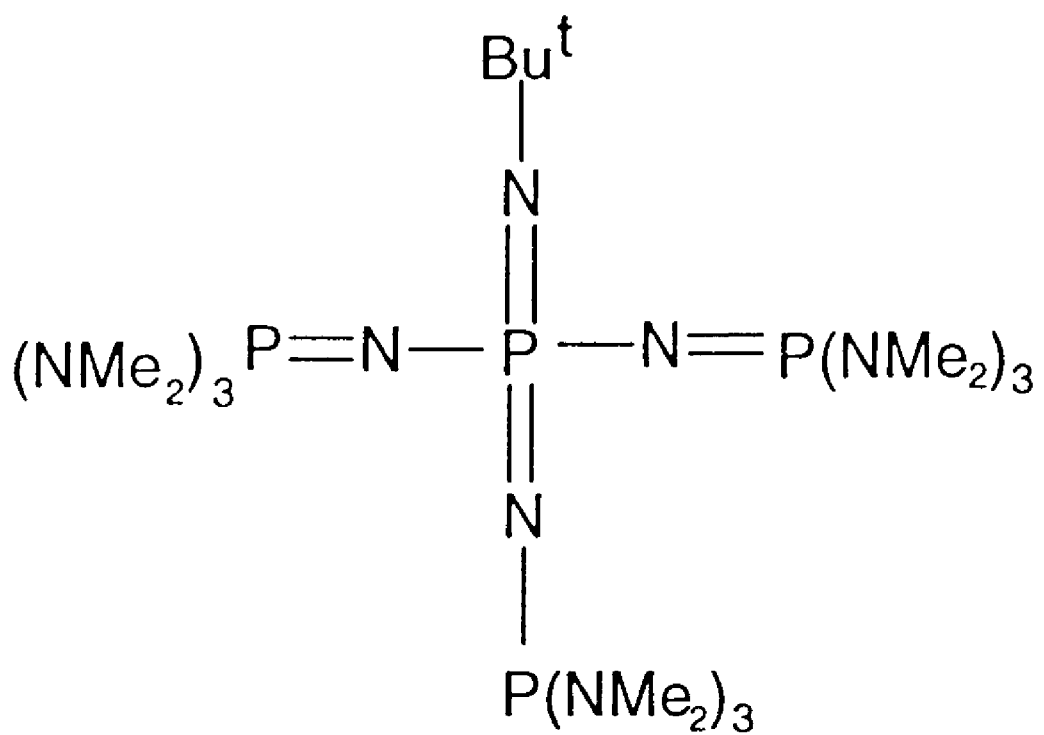

This invention relates to a process for making siloxane compositions, more specifically compositions wherein high viscosity polysiloxanes are dispersed in volatile, cyclic polysiloxanes (also known as cyclosiloxanes).

Cyclosiloxanes are critical intermediates in the silicone industry, primarily as starting monomers for polymerisation. Several general routes are known for the preparation of cyclosiloxanes. Together with hydroxy-endblocked linear polydiorganosiloxanes, they are formed as a product of hydrolysis of the corresponding diorganodihalosilanes. Mixtures of cyclic and/or linear polydiorganosiloxanes can also be equilibrated or "cracked" by reaction in the presence of a catalyst such as a base to form an equilibrium mixture of more desired cyclics and linears.

Various catalysts are known for the polymerisation of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerisations can be carried out in bulk, in solvents (such as non-polar or polar organic solvents) or in emulsion. An endblocking agent may be used to regulate the molecular weight of the polymer and/or to add functionality. Polymerisation may be terminated by using a neutralizing agent which reacts with the catalyst to render it non-active. In most cases catalyst residues remain in the polymer product and are desirably removed, such as by filtration.

Dispersions of high viscosity polysiloxanes in cyclic polysiloxanes have been known for some time and have been commercially available. These dispersions have a variety of useful characteristics and are important ingredients in many cosmetic compositions. They are generally prepared by physically mixing high viscosity siloxanes into a medium of cyclic siloxanes which have a low viscosity. This method is tedious and requires a lot of energy to ensure a more or less homogeneous dispersion as the high viscosity materials may have a viscosity which amounts to several $m^2/s$. It is possible to dissolve the high viscosity materials in a solvent prior to the dispersion in the cyclic siloxanes in order to reduce the handling viscosity and hence ease the dispersion. However, this leaves the manufacturer with the added disadvantage that a solvent is present and needs to be removed. This disadvantage is all the more serious since the cyclic siloxane materials are volatile to some extent and could be at least partially removed when the solvent is removed.

EP-A-0 503 825 discloses a method of making a dispersion of high viscosity siloxanes in volatile cyclosiloxanes by selectively condensing hydrolysable siloxanes in the presence of volatile cyclosiloxanes using catalysts which are phosphonitrile halides or selected metal compounds. This suffers from the disadvantage that there is a need to make a first dispersion of the hydrolysable siloxane in volatile cyclosiloxanes, and filtration of the eventual product is required to remove catalyst residues.

We have now found that a dispersion of high viscosity siloxanes in volatile cyclosiloxanes can be made in a single step by the ring-opening polymerisation of cyclosiloxanes catalysed by phosphazene bases.

Phosphazene bases are known to be extremely strong bases. Numerous phosphazene bases and routes for their synthesis have been described in the literature, for example in Schwesinger et al, Liebigs Ann. 1996, 1055–1081.

The use of a phosphazene base catalyst for the ring-opening polymerisation of a cyclosiloxane on a laboratory scale has been described in Molenberg and Möller, Macromol Rapid Commun. 16, 449–453 (1995). Octamethylcyclotetrasiloxane(D4, where D denotes an —Si$(CH_3)_2$O— unit) was polymerised in toluene solution in the presence of methanol and the phosphazene base I (FIG. 1), used as a 1 molar solution in hexane. All the components were carefully dried before the reaction, which was carried out under an argon atmosphere containing less than 1 ppm $O_2$ and $H_2O$. The methanol was deprotonated by the phosphazene base to form methoxide ions which initiate the reaction. A similar reaction system has been used by Van Dyke and Clarson in Poly Prep ACS Div Polym Chem 1996, 37, 668. In this case, tetraphenyltetramethylcyclotetrasiloxane, the phenylmethyl analog of D4, was polymerised. The catalyst system was the same as in Molenberg and Möller, and again all the reaction components were carefully dried beforehand. The phosphazene base catalysts were used in an amount of more than 800 ppm based on the weight of D4.

We have found that the phosphazene base-catalysed polymerisation can be adapted to produce a blend of a high viscosity polysiloxane dispersed in volatile cyclosiloxanes. We have also found that the hexane/methanol activated catalyst can give erratic polymerisation behaviour. We have therefore additionally sought a catalyst medium that gives reproducible polymerisation, preferably without the need for solvent. We have surprisingly found that it is also possible to carry out the ring-opening polymerisation of cyclosiloxanes with a phosphazene base catalyst in the presence of water. In the simplest case, sufficient water can be provided simply by taking no special steps to dry the cyclosiloxane starting material. To ensure the presence of water it is sufficient to avoid totally anhydrous conditions. Very small amounts of water, e.g. a few molecules, have been found to suffice to allow the polymerisation to take place. Furthermore, we have found that it is not essential to form a methoxide ion, e.g. by using methanol, in contrast to the prior art teaching.

The present invention thus provides a process for making a dispersion of a high viscosity siloxane in a volatile cyclosiloxane, which comprises effecting the ring-opening polymerisation of a volatile cyclosiloxane under catalysis by a phosphazene base, and stopping the polymerisation reaction before completion of the ring-opening polymerisation of the cyclosiloxane has occurred.

The high viscosity siloxane in the dispersion produced according to the invention may typically be a gum with a molecular weight of from 100,000 to 5,000,000 more preferably from 500,000 to 1,000,000. Where molecular weight is used in this specification, number average molecular weight is intended unless otherwise indicated. The percentage by weight of gum in the dispersion is preferably from 5% to 40%, more preferably from 15% to 35%. In the case of dispersions containing about 15% gum, the viscosity of the composition may be from 5,000 to 10,000 $mm^2/s$ at 25° C.

If the desired composition is to contain 15% gum, 85% of the cyclosiloxane starting material has to be unpolymerised. We have surprisingly found that it is possible to form a gum size polymer after only 15% conversion of cyclosiloxane has been polymerised. A molecular weight of greater than 350,000 is needed to reach a targeted viscosity higher than 5,000 $mm^2/s$ at 25° C. for a dispersion with only 15% of polymer in the blend.

High molecular weight polymers can be achieved only when the initial concentration of catalyst is low.

The phosphazene base reacts with trace quantities of water present to form highly active hydroxide ions which initiate the polymerisation. The phosphazene base will also react with certain other chemical groups which may be present, e.g. silanol or alcohol, to form similarly active polymerisation-initiating species. The phosphazene base may be in ionic form, with a strong anion such as fluoride or hydroxide, which is active in initiating polymerisation.

As the phosphazene base is a very powerful catalyst for the polymerisation, it can be present in a relatively low proportion, for example from 1–500 ppm by weight, based on the weight of cyclosiloxane. A preferred range is 2–200 ppm, more preferably 5–50 ppm. The proportion of catalyst actually used will be selected depending on the polymerisation product that is sought.

The proportion of water present in the reaction is generally at least 0.5 mol per mol of phosphazene base, preferably from 0.5–10 mols per mol of phosphazene base, more preferably from 1 mol–10 mols per mol of phosphazene base. It is possible to employ higher proportions of water, and this can have the benefit of enabling greater control over the polymerisation reaction, as described in more detail below.

In principle, any phosphazene base is suitable for use in the present invention. Phosphazene bases have the following core structure P=N—P=N, in which free N valencies are linked to hydrogen, hydrocarbon, —P=N or =P—N, and free P valencies are linked to —N or =N. A wide range of suitable phosphazene bases has been described in Schwesinger et al (see above). Some phosphazene bases are commercially available from Fluka Chemie AG, Switzerland. The phosphazene bases preferably have at least 3 P-atoms. Some preferred phosphazene bases are of the following general formulae:

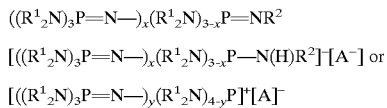

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ alkyl group; x is 1, 2 or 3, preferably 2 or 3; y is 1, 2, 3 or 4, preferably 2, 3 or 4; and A is an anion, preferably fluoride, hydroxide, carbonate, silanolate, alkoxide or bicarbonate.

In particularly preferred compounds, $R^1$ is methyl, $R^2$ is tert, butyl or tert.octyl, x is 3, y is 4 and A is fluoride or hydroxide. A preferred compound is the phosphazene base I shown in FIG. 1.

The polymerisation can be carried out in bulk or in the presence of a solvent. Preferably the polymerisation is carried out in bulk.

The phosphazene base catalyst can be diluted in a hydrocarbon solvent, such as hexane or heptane, or dispersed in a silicone fluid such as polydiorganosiloxanes. Where the phosphazene base catalyst is initially in a solvent such as hexane, the hexane can be removed by evaporation under vacuum, and the catalyst dispersed in a silicone fluid to give a stable clear solution. When this silicone dissolved catalyst is used for polymerisation reactions, the catalyst disperses evenly and gives reproducible results. The catalyst can also be dissolved in water, and this has the advantage of moderating and enabling greater control over the polymerisation reaction, as described below.

The polymerisation reaction can be carried out at ambient temperature or under heating. A preferred temperature range is 20° C. to 200° C. preferably 80 to 150° C. Heating, for example to 100° C. or higher, is appropriate when the catalyst activity has been moderated as described below. The time taken for polymerisation will depend on the activity of the catalyst in the chosen system, and on the desired polymer product. In the absence of moderation, the phosphazene base catalysts are sufficiently active to convert cyclosiloxanes such as D4 to high molecular weight polymers within a few seconds.

The starting material is a cyclosiloxane (also known as a cyclic siloxane). The description relating to the cyclosiloxane also applies to the volatile cyclosiloxane portion of the dispersion obtained by a process according to the invention. With volatile is meant that the cyclosiloxane has no more than 12 silicon atoms in the molecule. Cyclic siloxanes which are useful are well known and commercially available materials. They have the general formula $(R_2SiO)_n$, wherein R denotes hydrogen or an optionally subtituted alkyl, alkenyl, aryl, alkaryl or aralkyl group having up to 8 carbon atoms, n denotes an integer with a value of from 3 to 12. R can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. the aryl and aralkyl groups can be, for example, phenyl, tolyl, and benzoyl. The preferred groups are methyl, ethyl, phenyl, vinyl, and trifluoropropyl. Preferably at least 80% of all R groups are methyl or phenyl groups, most preferably methyl. It is most preferred that substantially all R groups are methyl groups. Preferably the value of n is from 3 to 6, most preferably 4 or 5. Examples of suitable cyclic siloxanes are octamethyl cyclotetrasiloxane, decamethyl pentacyclosiloxane, cyclopenta (methylvinyl)siloxane, cyclotetra(phenylmethyl) siloxane and cyclopenta methylhydrosiloxane. One particularly suitable commercially available material is a mixture of octamethylcyclo-tetrasiloxane and decamethylcyclopentasiloxane.

Where R is methyl, the compound is referred to as Dn; for example, where n=4 the compound is called D4.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing can result in the catalyst being encapsulated in beads of gum as it is added to the reaction, and the catalyst then takes some time to diffuse out of the gum particles, giving a slower reaction.

The required viscosity of the dispersion produced according to the invention can be achieved by monitoring the viscosity during the reaction and by stopping the reaction when required.

Stopping of the polymerisation reaction is achieved by adding an agent which neutralises the phosphazene base catalyst. Suitable agents are carbon dioxied and acids, such as acetic acid, silyl phosphate, silyl phosphonate, chlorosilanes and polyacrylic acid. A preferred quenching agent is carbon dioxide in the form of gaseous or liquid carbon dioxide. The use of "dry ice" pellets is also possible and this use or the use of liquid carbon dioxide rapidly cools the reaction at the same time.

Endblockers may be included in the reaction to control the molecular weight of the polymer and/or to add desired endgroups on the polymer. Suitable endblockers are, for example, polysiloxanes in the viscosity range of 1 to 150,000 mm$^2$/s at 25° C., in particular polydimethylsiloxanes of the general formula MD$_x$M where M is trimethylsilyl, D is —Si(CH$_3$)$_2$O— and x has a value of from 0 to 20. The endblocker may have one or more functional groups such as hydroxy, vinyl, hydrogen or amino. Water also acts as a endblocker, with the introduction of hydroxy functional groups. Particularly preferred endgroups for the polymer are SiOH or SiMe, where Me denotes a methyl group. In the presence of added water, SiOH ended gum can be obtained as a blend in cyclics. The concentration of water determines the molecular weight of the gum. SiOH functional polymer of any chain length can thus be obtained. The use of water as an endblocker has the additioal advantage of slowing down the reaction for better control.

We have found during preparation of the phosphazene base catalysts that air reacts very rapidly with the catalyst solutions giving a hazy material which eventually leads to an insoluble liquid phase. This is believed to be due to the reaction of the catalyst with water and/or $CO_2$ to form an insoluble hydroxide or carbonate salt. We have also found that this deactivation of the catalyst can be reversed e.g. by heating, purging with inert gas or subjecting to reduced pressure. This makes it possible to moderate or control the polymerisation reaction. This is particularly advantageous in view of the very rapid reaction which occurs when the catalyst is not moderated. Because of the very low levels of catalyst employed in these reactions (which can be as low as 1–10 ppm), the reaction with water and $CO_2$ needs to be taken into account to control the reaction and to obtain reproducible results. By dissolving the phosphazene base in water, in which it is very soluble and very stable, the catalyst activity becomes much more controllable and the polymers produced are of lower molecular weight. This is caused by the water acting as a catalyst inhibitor and also as an endblocker. The inhibiting effect of the water can be reduced by reducing the amount of water present, e.g. by heating. At temperatures below 100° C. the rate of polymerisation in the presence of water or $CO_2$ is relatively slow, for example taking up to more than 24 hours to reach gum viscosity. At temperatures above 100° C. (e.g. 100–150° C.), polymerisation becomes much faster, for example taking up to 5–60 minutes to reach high viscosity. Such control of the reaction can also be achieved if the water is mixed with or replaced by alcohol (e.g. $C_1$–$C_6$ alcohols such as methanol or ethanol).

We have also found that polymerisation can be prevented by exposing a mixture of cyclosiloxane and phosphazene base catalyst to air and/or $CO_2$. The polymerisation can then be initiated ("command polymerisation") simply by removing the air and/or $CO_2$, e.g. by heating the mixture (e.g. to 100° C.–140° C. for a few minutes). A D4 catalyst mixture (2–50 ppm of catalyst) is stable in air at 20° C. for extended periods (up to 7 days).

Prior methods for the synthesis of siloxane polymers by ring-opening equilibration polymerisation produced products which may typically consist of small cyclics (5–10% D4–D10), macrocyclics (5–10% D11–D50) and polymer (80–90%). The present invention makes it possible to produce polymer dispersions by ring-opening polymerisation which have low levels of macrocyclics. By the use of the phosphazene base catalysts in the ring opening polymerisation of e.g. D4 according to the present invention, it is possible to produce polymer dispersions that contain less than 1% total by weight of macrocyclics.

Thermogravimetric analysis (TGA) of the polymer dispersions produced according to the invention shows that the polymers have enhanced thermal stability. High molecular weight gums have been produced with decomposition onset temperatures of more than 450° C. the enchanced thermal stability is attributed to the very low levels of catalyst residues remaining in the product. The low catalyst residues also mean that a filtration step is usually not necessary, which is a very significant process advantage.

The following Examples illustrate the invention. Unless stated otherwise, all parts and percentages are by weight, and the phosphazene base used is that of formula I shown in FIG. 1 (commercially available from Fluka, catalogue number 79421).

EXAMPLE 1

Preparation of Phosphazene Base Solution in Siloxane Fluid

A mixture of 1.33 g of hexamethyldisiloxane and 48.67 g of octamethylcyclotetrasiloxane was degassed in a schlenk flask by bubbling nitrogen gas through the solution for a period of 2 hours. To the solution was then added 1 ml of a 1.0 M solution in hexane of phosphazene base I. The solution viscosity immediately began to rise with stirring. After equilibration at room temperature for 24 hours, the mixture was reqdy for use as the catalyst solution for the subsequent polymerisation of dimethyl cyclosiloxanes.

EXAMPLE 2

Preparation of Phosphazene Base Solution in Heptane

The catalyst solution in heptane (less volatile than n-hexane) was prepared as follows: in a Schlenck tube under nitrogen 49 cm$^3$ of heptane and 1 ml of phosphazene base in solution in n-hexane 1 mol/l were mixed. The concentration of the final catalyst was 0.02 mol/l.

EXAMPLE 3

Non-equilibrium polymerisation of D4 in the presence of a vinyl endblocker, was undertaken in bulk under nitrogen in a thermostated glass reactor, fitted with a mechanical stirrer. The catalyst, dissolved in water, was weighed in a syringe and injected into the reaction mixture. The stop watch was activated as soon as the phosphazene base was added to the cyclics. After quenching, the resulting polymer blend was analysed by capillary gas chromatography (GC) and size exclusion chromatography (SEC).

The results are shown in the following Tables 1, 2 and 3. In Table 1, the phosphazene concentration is 10 ppm. The reaction mixture was cooled with $CO_2$, and quenched with $CO_2$ and acetic acid in toluene (×100 in excess) about 13 minutes ten seconds after adding the catalyst. The viscosity of the blend produced was 13,000 cS.

In Table 2, the phosphazene concentration was 5 ppm. The reaction mixture was cooled with $CO_2$, quenched with $CO_2$ and acetic acid in toluene (×100 in excess) about 6 minutes 30 seconds after adding the catalyst.

In Table 3, the phosphazene concentration was 5 ppm. The reaction mixture was cooled with $CO_2$, and quenched with $CO_2$ and acetic acid in toluene (×20 in excess) about 11 minutes after adding the catalyst.

TABLE 1

| Temp (° C.) | Time | $D_4$ | other oligo. M < 1100 | Polymer M > 1100 | Mpeak Polymer |
|---|---|---|---|---|---|
| 105 | 2 min 35 s | 94.7 | 1.5 | 3.8 | 4918 |

TABLE 1-continued

| Temp (° C.) | Time | $D_4$ | other oligo. M < 1100 | Polymer M > 1100 | Mpeak Polymer |
|---|---|---|---|---|---|
| 105 | 3 min 35 s | 92.2 | 1.1 | 6.7 | 11610 |
| 105 | 5 min | 85.3 | 3.9 | 10.8 | 27140 |
| 105 | 8 min 25 s | 72.6 | 5.9 | 21.5 | 60070 |
| 105 | 10 min 50 s | 59.8 | 6.0 | 34.2 | 73170 |
| 105 | 12 min 45 s | 55.1 | 6.8 | 38.1 | 74230 |
| 29 | 36 min 50 s | 51.9 | 6.4 | 41.6 | 79939 |
| 29 | 1 h 28 min | 51.2 | 7.5 | 41.3 | 77770 |

TABLE 2

| Temp (° C.) | Time | $D_4$ | other oligo. M < 1100 | Polymer M > 1100 | Mpeak Polymer |
|---|---|---|---|---|---|
| 102 | 2 min | 90.2 | 2.1 | 7.7 | 21620 |
| 102 | 4 min | 71.4 | 5.4 | 23.2 | 63000 |
| 102 | 5 min | 57.3 | 7.1 | 35.6 | 100900 |
| 35 | 21 min | 52.1 | 6.5 | 41.4 | 92180 |
| 37 | 59 min | 51.3 | 6.3 | 42.4 | 97240 |
| 34 | 4 h | 51.7 | 5.8 | 42.5 | 108500 |
| 24 | 30 h | 51.6 | S.7 | 42.7 | 117700 |

TABLE 3

| Temp (° C.) | Time | $D_4$ | other oligo. M < 1100 | Polymer M > 1100 | Mpeak Polymer |
|---|---|---|---|---|---|
| 101 | 2 min 10 s | 90.3 | 0 | 9.7 | 12780 |
| 101 | 5 min | 72.6 | 7.11 | 20.3 | 59280 |
| 101 | 9 min 10 s | 58.7 | 5.5 | 35.8 | 82690 |
| 101 | 10 min 20 s | 55.6 | 5.7 | 38.7 | 88470 |
| 24 | 41 min | 50.0 | 6.4 | 43.6 | 95950 |
| 26 | 18 h | 50.2 | 6.2 | 43.6 | 93870 |
| — | 180 h | 50.5 | 6.2 | 43.3 | 89550 |

EXAMPLE 4

Following the procedure of Example 3, the endblocker $MD_xM$ (DC 200 fluid, 10 cS) was used during polymerisation of D4 to control the molecular weight of the polymer in the gum-in-cyclics composition. For each target molecular weight (Mpeak expected), 1 mol of endblocker per mol of polymer was used. One can calculate a theoretical molecular weight (Mpeak calculated) at partial conversion of D4 as follows:

Mpeak Calculated=Mpeak Expected×% Polymer

The results in Table 4 below show that the molecular weights determined by SEC are in accordance with theoretical Mpeak.

TABLE 4

| [catalyst] mol/l | T (° C.) | Mpeak expected (at 100% D4) conversion | Mpeak calculated | Mpeak SEC | % Polymer |
|---|---|---|---|---|---|
| $10^{-4}$ | 41 | 400,000 | 150,000 | 217,400 | 37.6 |
| $10^{-6}$ | 25–65 | 100,000 | 75,000 | 67,000 | 75.1 |
| $10^{-5}$ | 45 | 200,000 | 33,000 | 40,000 | 16.7 |
| $10^{-6}$ | 55 | 200,000 | 160,000 | 212,300 | 78.6 |

EXAMPLE 5

In a similar way to that in Example 4, the effect of water acting as an endblocker leading to SiOH functional polymers of various sizes was investigated. Reactions were carried out with various concentrations of water premixed with the commercial solution of phosphazene base (1 mol/l in hexane). Table 5 below shows a good match between theoretical calculated Mpeak and experimental Mpeak determined by SEC.

TABLE 5

| [catalyst] (ppm) | T (° C.) | $[H_2O]_o$ mol/l | % Polymer | Mpeak calculated | Mpeak SEC |
|---|---|---|---|---|---|
| 5 | 101 | $4.00 \times 10^{-3}$ | 43.3 | 100,000 | 90,000 |
| 5 | 102 | $4.00 \times 10^{-3}$ | 42.7 | 100,000 | 117,000 |
| 5 | 83 | $4.35 \times 10^{-4}$ | 20.5 | 446,000 | 450,000 |
| 10 | 84 | $8.70 \times 10^{-4}$ | 23.5 | 256,000 | 292,000 |

It is thus possible to synthesise gum-in-cyclics blends containing silanol-ended polymer with controlled molecular weight. Water also has the advantage of slowing the polymerisation down to allow much more control over the polymerisation.

That which is claimed is:

1. A process for making a dispersion of a high viscosity siloxane in a volatile cyclosiloxane, which comprises the step of effecting ring-opening polymerisation of a volatile cyclosiloxane under catalysis by a phosphazene base, and the step of stopping the polymerisation reaction before completion of the ring-opening polymerisation of the cyclosiloxane has occurred.

2. A process according to claim 1, in which the polymerisation reaction is stopped by adding carbon dioxide.

3. A process according to claim 2, in which the reaction is stopped by adding carbon dioxide selected from the group consisting of gaseous carbon dioxide and liquid carbon dioxide.

4. A process according to claim 1, in which the polymerisation is topped by adding an acid.

5. A process according to claim 1, in which the phosphazene base is present in an amount of from 1–500 ppm by weight, based on the weight of cyclosiloxane.

6. A process according to claim 1, in which water is present in an amount of at least 0.5 mols per mol of phosphazene base.

7. A process according to claim 1, in which the phosphazene base is present in an amount of from 2–200 ppm by weight, based on the weight of cyclosiloxane, and water is present in an amount of at least 1 mol per mol of phosphazene base.

8. A process according to claim 1, in which the phosphazene base is selected from the group consisting of phophazene bases of the general formula (I):

$$((R^1{}_2N)_3P=N-)_x(R^1{}_2N)_{3-x}P=NR^2 \quad (I)$$

of phophazene bases of the general formula (II):

$$[((R^1{}_2N)_3P=N-)_x(R^1{}_2N)_{3-x}(P-N(H)R^2)]^+[A^{31}] \quad (II)$$

of phophazene bases of the general formula (III):

$$[((R^1{}_2N)_3P=N-)_y(R^1{}_2N)_{4-y}P]^+[A]^- \quad (III)$$

in which each $R^1$, is independently selected from the group consisting of hydrogen, a hydrocarbon group and a substituted hydrocarbon group, and of phophazene bases of the general formulae (I), (II) or (III) in which two $R^1$ groups bonded to the same N-atom are linked to complete a heterocyclic ring; each $R^2$ is independently selected from the group consisting of hydrogen, a hydrocarbon group and a substituted hydrocarbon group; x is 1, 2 or 3; y is 1, 2, 3 or 4; and A is an anion.

9. A process according to claim 1, in which the cyclosiloxane is of the general formula $(R_2SiO)_n$, wherein R is selected from the group consisting of hydrogen, a $C_{1-8}$ alkyl, a $C_{1-8}$ alkenyl, a $C_{6-8}$ aryl, a $C_{6-8}$ alkaryl, a $C_{6-8}$ aralkyl,, a substituted $C_{1-8}$ alkyl, a substituted $C_{1-8}$ alkenyl, a substituted $C_{6-8}$ aryl, a substituted $C_{6-8}$ alkaryl and a substituted $C_{6-8}$ aralkyl, and n denotes an integer with a value of from 3 to 12.

10. A process according to claim 1, in which an agent which inhibit catalyst activity is initially present, and in which polymerisation is initiated by reducing the effect of the inhibiting agent or conditions.

11. A process according to claim 10, in which the inhibiting agent is selected from the group consisting of carbon dioxide, excess water and a mixture of carbon dioxide and excess water, and the polymerisation reaction is initiated by heating.

12. A process according to claim 1, in which an end-blocker is present in an amount calculated to result in a desired molecular weight range of polymer.

13. A dispersion of a high viscosity siloxane in a volatile cyclosiloxane produced by a process which comprises the step of effecting ring-opening polymerization of a volatile cyclosiloxane under catalysis by a phosphazene base, and the step of stopping the polymerisation reaction before completion of the ring-opening polymerisation of the cyclosiloxane has occurred.

14. A dispersion according to claim 13 containing from 5 to 40% by weight of high viscosity siloxane having a molecular weight of from 100,000 to 5,000,000.

* * * * *